US012746923B2

(12) United States Patent
Ashley, III et al.

(10) Patent No.: US 12,746,923 B2
(45) Date of Patent: Sep. 29, 2026

(54) VEHICLE TETHER WITH TWO DYNAMIC LEGS

(71) Applicant: HPTechAi LLC, College Station, TX (US)

(72) Inventors: Michiel A. Ashley, III, College Station, TX (US); Matthew W. Hancock, Caldwell, TX (US); Austin Lee Carroll, Bryan, TX (US)

(73) Assignee: HPTechAi LLC, College Station, TX (US)

( * ) Notice: Subject to any disclaimer, the term of this patent is extended or adjusted under 35 U.S.C. 154(b) by 0 days.

(21) Appl. No.: 19/213,423

(22) Filed: May 20, 2025

(65) Prior Publication Data

US 2025/0353499 A1 Nov. 20, 2025

Related U.S. Application Data

(60) Provisional application No. 63/649,694, filed on May 20, 2024.

(51) Int. Cl.

| | |
|---|---|
| ***B60W 30/165*** | (2020.01) |
| ***B60D 1/14*** | (2006.01) |
| ***B60D 1/167*** | (2006.01) |
| ***B60W 10/04*** | (2006.01) |
| ***B60W 10/18*** | (2012.01) |
| ***B60W 10/20*** | (2006.01) |
| *B60D 1/24* | (2006.01) |

(52) U.S. Cl.

CPC ........... *B60W 30/165* (2013.01); *B60D 1/143* (2013.01); *B60D 1/1675* (2013.01); *B60W 10/04* (2013.01); *B60W 10/18* (2013.01); *B60W 10/20* (2013.01); *B60D 1/249* (2013.01); *B60W 2554/802* (2020.02); *B60W 2710/18* (2013.01); *B60W 2710/20* (2013.01)

(58) Field of Classification Search

CPC .... B60W 30/165; B60W 10/04; B60W 10/18; B60W 10/20; B60W 2554/802; B60D 1/143; B60D 1/1675; B60D 1/249

See application file for complete search history.

(56) References Cited

U.S. PATENT DOCUMENTS

| | | | | |
|---|---|---|---|---|
| 10,983,531 | B2 * | 4/2021 | Amla | B60W 30/00 |
| 2018/0105172 | A1 * | 4/2018 | Gesch | B60W 30/14 |
| 2018/0251153 | A1 * | 9/2018 | Li | B60D 1/06 |
| 2019/0016217 | A1 * | 1/2019 | Buttolo | B60K 31/00 |
| 2019/0086204 | A1 * | 3/2019 | Critchley | B60D 1/245 |
| 2021/0256853 | A1 * | 8/2021 | Pandy | B60W 50/16 |

* cited by examiner

*Primary Examiner* — Ramsey Refai

(74) *Attorney, Agent, or Firm* — Schwegman Lundberg & Woessner, P.A.

(57) ABSTRACT

Physically tethered platooning with exact path following and decreased risk of jack-knifing can be achieved using a compliant vehicle tether including two damped dynamic legs each including a prismatic joint. The tether may have a generally triangular configuration, with legs extending between a single front-end connector configured to attach to a lead vehicle and two respective rear-end connectors configured to attach to the follow vehicle at two mount points by suitable joints. The prismatic joints may be implemented, in accordance with various embodiments, by double-acting hydraulic cylinders or rack-and-pinion systems, equipped with electrically controlled flow control valves for active damping.

21 Claims, 13 Drawing Sheets

VEHICLE TETHER WITH TWO DYNAMIC LEGS

CROSS-REFERENCE TO RELATED APPLICATION

This application claims priority to and the benefit of U.S. Provisional Patent Application No. 63/649,694, filed on May 20, 2024, the contents of which are hereby incorporated herein by reference in their entirety.

BACKGROUND

Vehicle platooning is a transportation technology where multiple vehicles—such as trucks, cars, or buses—drive closely together in formation, usually with a lead vehicle controlling speed and direction and one or more follower vehicles trailing behind the lead vehicle at preset intervals. The lead vehicle, or "leader," is often driven by a human driver, while the follower vehicles, or "followers," adjust their speed and direction automatically or semi-automatically to maintain tight spacing and smooth operation. Untethered platooning systems (i.e., systems without physical connections between the vehicles), which are used, e.g., in commercial freight transport on highways, typically rely on wireless communication and data sharing between the lead and follow vehicles, along with a high degree of automation, with each follow vehicle independently managing its steering, acceleration, and braking. Such systems tend to be complex and risk-prone. Physically tethered (or, "hard") platooning systems, by comparison, are much less dependent on wireless communication and automation, as the physical tether (or linkage) between the vehicles keeps them in sync mechanically as well as enables a wired connection. Such systems tend to be more robust, and thus preferable for military convoys. If the tether is implemented as a load-bearing tow bar, it moreover provides the option of towing the follower(s) by the leader in the case of a failure in communications between the vehicles or the automation systems of the followers. However, with conventional tethers for vehicle platooning, sudden acceleration/braking of the leader, or loss of traction of either leader or followers, can cause jack-knifing—a dangerous situation that occurs when control over the platoon is lost and the follower swings out to the side, or moves straight on as the leader spins (e.g., on an icy road), forming an acute angle between lead and follow vehicles, like the shape of a folding jack-knife. This situation can cause cargo damage or spillage, and in extreme cases multi-vehicle accidents.

SUMMARY

Described herein is a vehicle tether for physically tethered platooning that is configured to provide sufficient relative freedom of movement between the vehicles to allow the follower to trace the path of the leader, but within limits that maintain stability and prevent or at least reduce the probability of jack-knifing. The vehicle tether generally includes two "dynamic" or "compliant" (i.e., extensible) legs, connected between lead and follow vehicles in a trilateral or quadrilateral configuration, that are equipped with mechanical dampers to preclude sudden extensions or contractions of the legs, and as such also constrain angular reconfigurations of the tether, which in turn stabilizes the relative orientation of the vehicles.

In various embodiments, the legs are connected via a shared front-end connector to a fixed point on the rear of the lead vehicle, and via a pair of rear-end connectors to two fixed, horizontally spaced points on the front of the follow vehicle. The joints between the legs and the front-end and rear-end connectors, between the front-end connector and the lead vehicle, and between the rear-end connectors and the follow vehicle may collectively provide six degrees of freedom of motion for changes in both relative positions and relative orientations of lead and follow vehicles in three dimensions. For example, the front-end connector may be connected to the lead vehicle by a standard pintle hitch (e.g., implemented by a lunette ring of the front-end connector that engages a standard pintle hook on the lead vehicle), or a custom hitch, that facilitates a change in relative pitch (rotation about a lateral vehicle axis) and roll (rotation about a longitudinal vehicle axis) between the lead vehicle and the front-end connector. Further, the rear-end connectors may be attached directly to the front bumper of the follow vehicle, or to a bumper mount to be affixed to the front of the follow vehicle, via horizontal revolute joints, allowing for a change in pitch between the rear-end connectors and the follow vehicle. Together, these joints between the front-end and rear-end connectors and the lead and follow vehicles, respectively, provide three degrees of freedom for the relative vertical positions as well as relative pitch and roll between the vehicles. Furthermore, the legs may be connected to both front and rear-end connectors via vertical revolute joints, allowing for four angular adjustments between the legs and the respective connectors within the plane defined by and containing the two legs, hereinafter the "tether plane." Alternatively, the angle between one of the legs and the front-end connector may be fixed, and a fourth adjustable angle be provided between the front-end connector and the lead vehicle. The four adjustable angles together with the adjustable lengths of the two dynamic legs constitute six adjustable parameters in the tether plane, which in conjunction with three geometric constraints imposed on the tether provide three degrees of freedom for the relative horizontal positions and the relative yaw (rotation angle about a vertical axis) between the lead and follow vehicles The dynamic legs are configured with prismatic joints, that is, joints permitting linear motion between two leg portions along an axis of the leg, but restricting rotational motion. The prismatic joints may be implemented, e.g., by hydraulic cylinders or rack-and-pinion systems. Active damping may be facilitated hydraulically, using an electrically actuated flow control valve to control a degree of damping. In hydraulic embodiments of the prismatic joints, the hydraulic cylinder may be a double-acting cylinder that forces fluid through the flow control valve as it moves a piston back and forth within the cylinder. In rack-and-pinion embodiments of the prismatic joints, which include a gear rack meshed with a pinion, the pinion may be connected to and actuate the input shaft of a hydraulic pump that forces fluid through the flow control valve as the pinion travels along the gear rack. In both cases, the resistance of the dynamic leg to changes in its length can be controlled by adjusting the flow control valve. As an alternative to hydraulic damping, an electronically controlled friction brake may be used to supply the damping force. Alternatively or additionally to active dampers, the dynamic legs may also be provided with passive dampers, e.g., implemented by hydraulic cushions or spring dampers, to slow changes in length of the dynamic legs near their limits of travel and thereby counter large impulse forces on the tether that might otherwise contribute to accelerated fatigue and wear.

In various embodiments, the vehicle tether is instrumented with sensors indicative of its configuration and, consequently, of the relative position and orientation of lead and follow vehicles. The sensor data can be processed by a suitable computational algorithm to compute control inputs for the follower's throttle, brake, and steering so as to cause the follower to follow the same path as the leader. To fully determine the configuration of the tether, it suffices to measure a set of three independent adjustable parameters, such as any three of: the length of the first dynamic leg, the length of the second dynamic leg, the angle between the first dynamic leg and the front-end connector, the angle between the second dynamic leg and the front-end connector, the angle between the front-end connector and the lead vehicle, the angle between the first dynamic leg and the rear-end connector, or the angle between the second dynamic leg and the rear-end connector; the remaining parameters are deterministically dependent on the selected three independent parameters. In some embodiments, however, four or more adjustable parameters are directly measured to provide redundancy to improve the reliability or accuracy of the computed path and the control inputs derived therefrom.

The vehicle tether may be provided with one or more additional features contributing to its practical utility. In some embodiments, the dynamic legs of the vehicle tether can be pinned in place at or near their neutral position (e.g., the center of the dynamic range of motion) such that, in case of a mechanical or electrical failure, the vehicle tether can still be used as a passive tow bar. Further, in some embodiments, the vehicle tether is equipped with electric motors for actuating the prismatic joints and one of the revolute joints such that the tether, mounted to the follow vehicle, can be automatically connected to the lead vehicle. Also, the vehicle tether may be foldable for easy storage; for instance, with a tether including a bumper mount intended for permanent attachment to the front bumper of the lead vehicle, the folded legs may be stood up vertically and secured to the bumper mount when not in use.

The forgoing summary serves to introduce various relevant concepts and provide an overview of various embodiments and features of vehicle tethers with dynamic legs in accordance herewith, but is not intended as limiting the scope of any particular embodiment. It is to be understood that many of the described features are optional.

BRIEF DESCRIPTION OF THE DRAWINGS

The foreign will be more readily understood from the following description of various illustrative embodiments, in particular, when taken in conjunction with the accompanying drawings.

DESCRIPTION

Figure 1A:
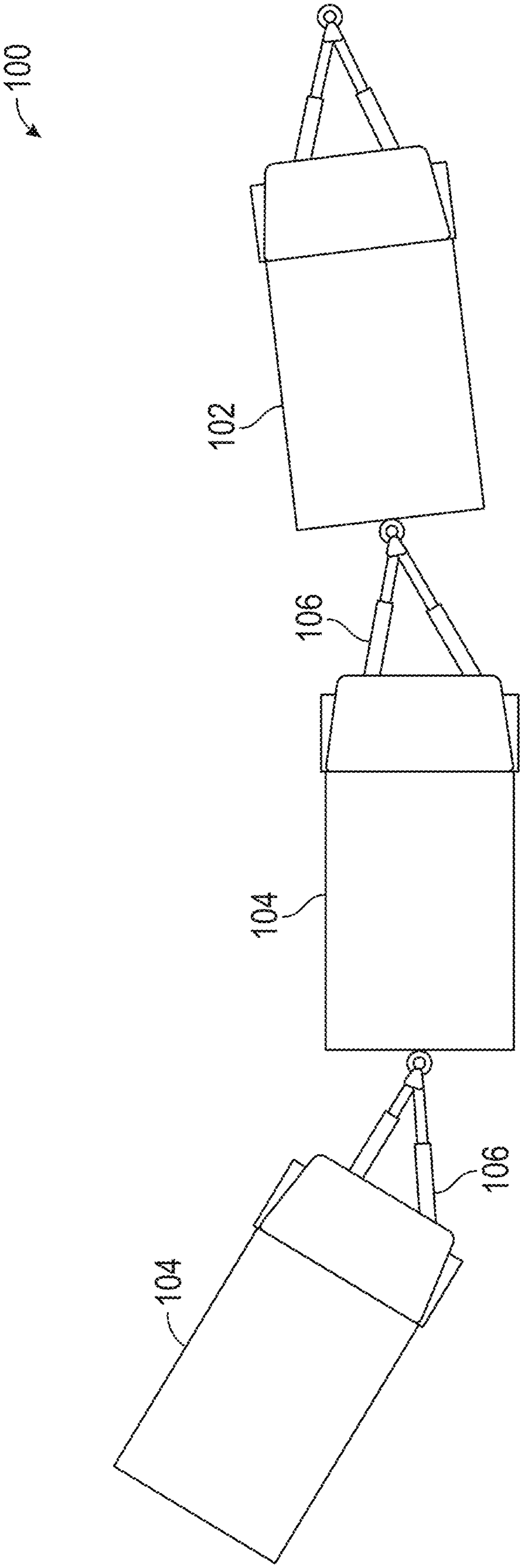
FIG. 1A is a schematic drawing showing, in top view, a vehicle platoon including a lead vehicle and two follow vehicles, connected in a train by compliant triangular vehicle tethers, in accordance with various embodiments.

FIG. 1A is a schematic drawing showing, in top view, a vehicle platoon 100 including a lead vehicle 102 and two follow vehicles 104, connected in a train by compliant triangular vehicle tethers 106, in accordance with various embodiments. Of course, the depiction of two follow vehicles 104 is only one example; in general, the platoon 100 may have any number of one or more follow vehicles 104, each connected to the preceding vehicle by a tether 106. The vehicle tethers 106 are "triangular" in the sense that, as illustrated, they each include two dynamic legs that are connected—indirectly via suitable connectors—between two separate respective attachment points on the front (usually the front bumper) of the follow vehicle 104 and a shared attachment point on the rear (usually the rear bumper) of the lead vehicle 102; however, more precisely, the configuration of the tether may be quadrilateral (see FIGS. 4A and 4B), as the front ends of the legs may be connected at separate (although generally closely spaced) points to the front-end connector, which is in turn connected to the lead vehicle 102. The legs can extend or contract by axial movement of a front portion relative to the rear portion of the leg, which allows changing not only the distance between the lead and follow vehicles 102, 104, but also the angle between the tether 106 and the follow vehicle 104. This mechanical flexibility enables exact path following.

Figure 1B:
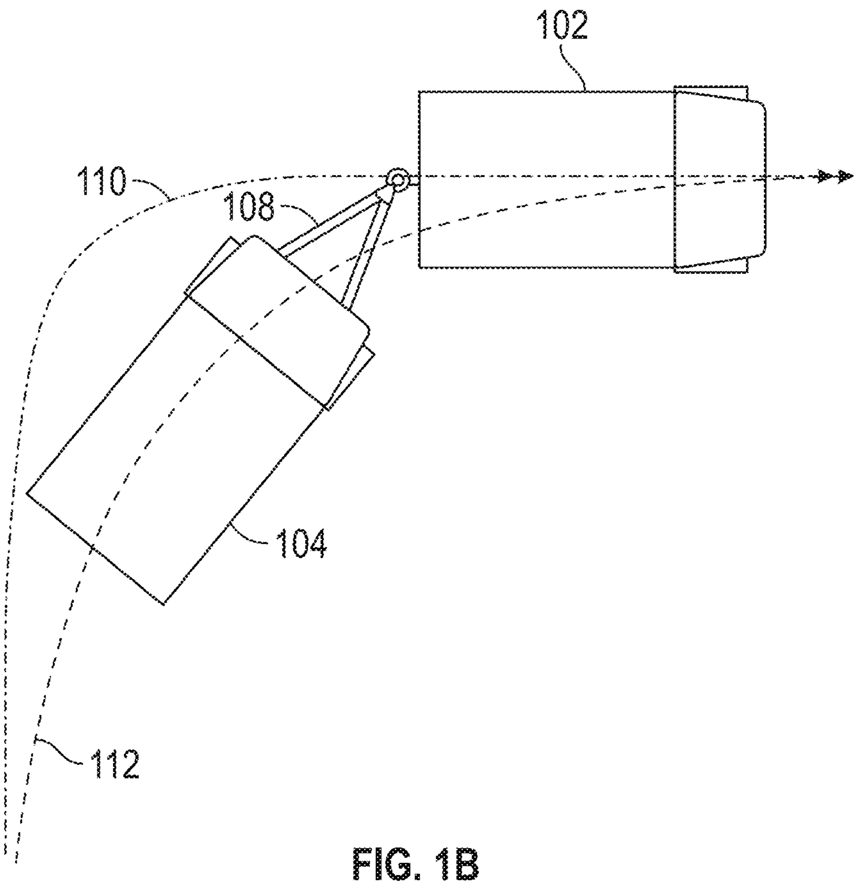
FIG. 1B is a schematic drawing showing, for comparison with FIG. 1A, lead and follow vehicles connected by a rigid triangular vehicle tether.

FIG. 1B is a schematic drawing showing, for comparison with FIG. 1A, lead and follow vehicles 102, 104 connected by a rigid triangular vehicle tether 108. In this case, the configuration, including length and interior angles, of the tether 108 is fixed, and within the plane of the tether 108, the only degree of freedom is the relative angle between the tether 108 (and thus the follow vehicle 104) and the lead vehicle 102. This limited freedom of motion limits the ability of the follow vehicle 104 to follow the exact path 110 of the lead vehicle 102. In a passive towing scenario, where the vehicle tether 108 is simply a triangular towbar, the follower 104 "cuts the corner" of the leader 102 during a turning maneuver, meaning that the follower's wheels track a path 112 inside the path 110 of the leader, as shown. This behavior generally calls for the lead vehicle 102 to make wider turns, which can be difficult in tight spaces. Also, since non-compliant legs provide no damping, any differences in throttle and brake between the lead and follow vehicles translates to large forces in the tether.

Figure 1C:
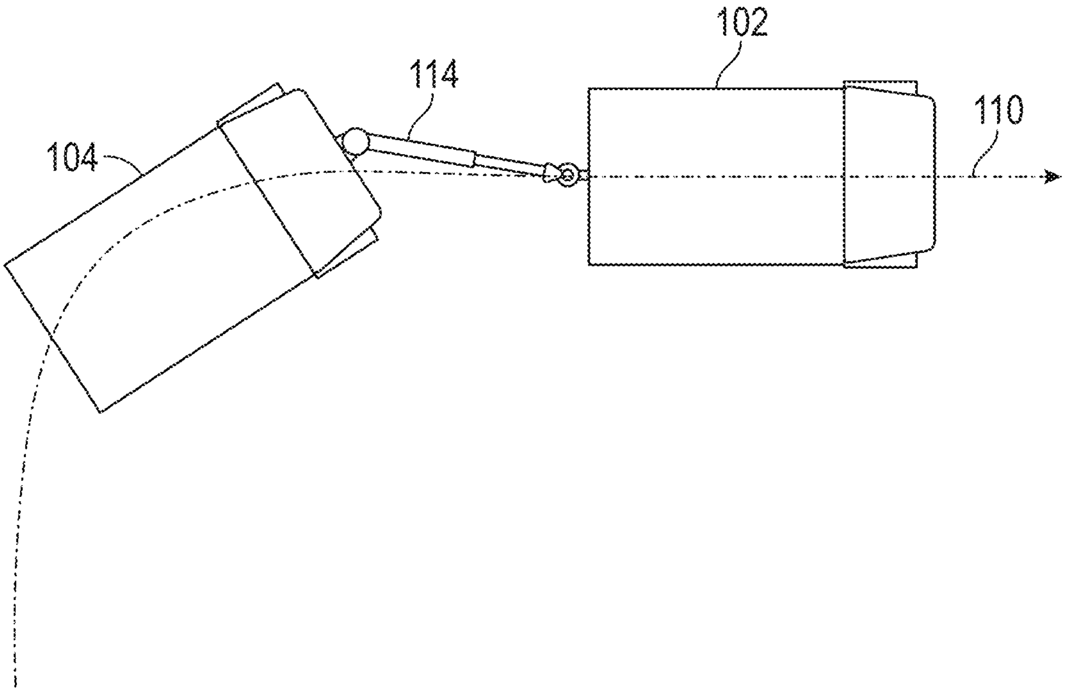
FIG. 1C is a schematic drawing showing, for comparison with FIG. 1A, lead and follow vehicles connected by a compliant vehicle tether including only a single dynamic leg.

FIG. 1C is a schematic drawing showing, for comparison with FIG. 1A, lead and follow vehicles 102, 104 connected by a compliant vehicle tether 114 including only a single dynamic leg. Here, the tether 114 can change in its length and its orientation relative to both lead and follow vehicles 102, 104. This high degree of relative freedom between the vehicles 102, 104 enables exact path following, even for tight turning radii, but comes at the cost of an increased likelihood of jack-knifing, as the tether 114 imposes no constraint on the relative orientation of the vehicles. The triangular compliant vehicle tether 106 of FIG. 1A stabilizes the follow vehicle path and reduces the risk of jack-knifing significantly while maintaining sufficient freedom of motion to allow the follower 104 to track the path of the leader 102 with high fidelity.

Figures 2A, 2B:
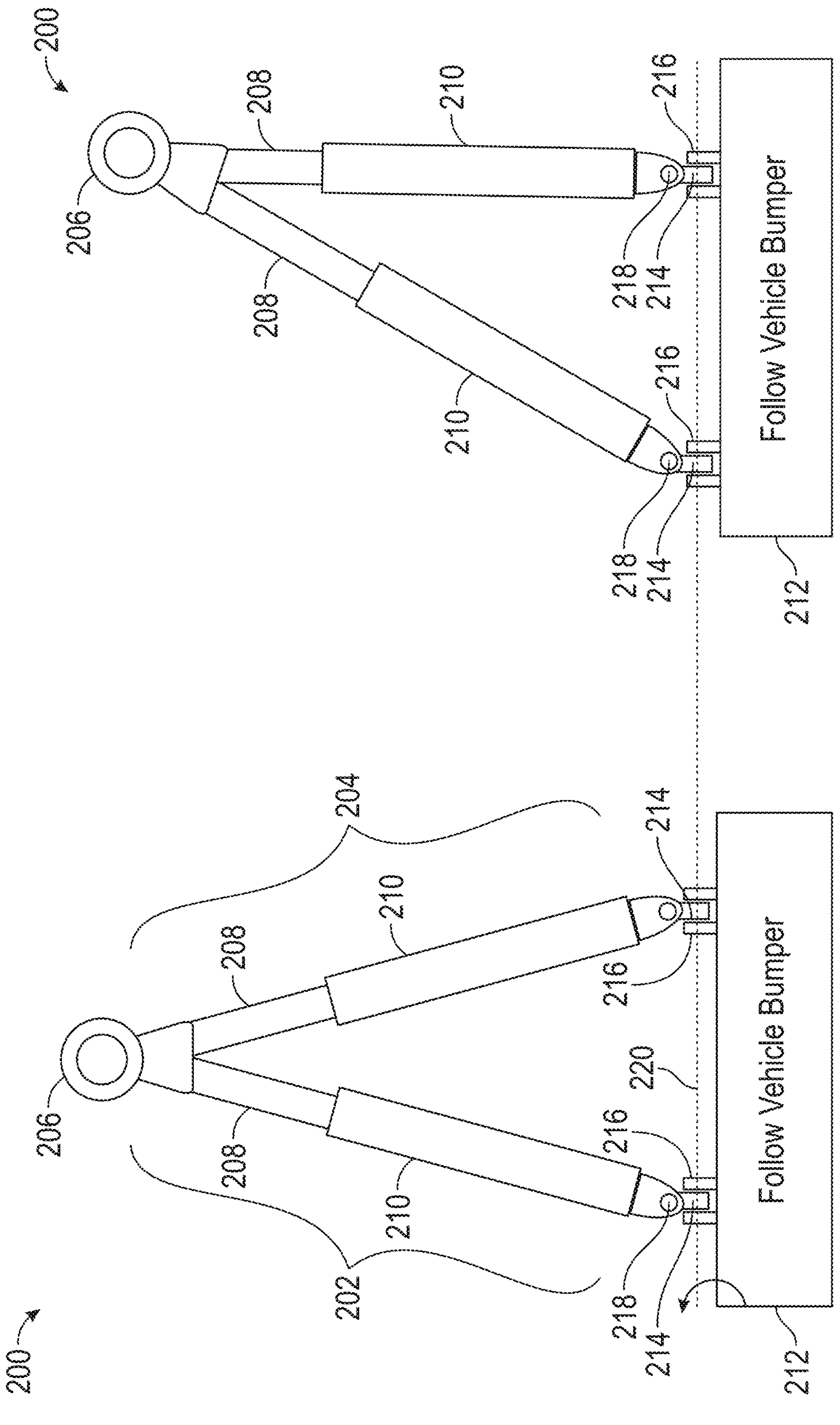
FIGS. 2A and 2B are schematic drawings of an example compliant triangular vehicle tether, according to various embodiments, in two configurations.

FIGS. 2A and 2B are schematic drawings of an example compliant triangular vehicle tether 200 (e.g., the vehicle tether 106 of FIG. 1A), according to various embodiments, in two configurations. The tether 200 includes two dynamic legs 202, 204 connected at their front ends to a shared front-end connector 206, which may, as in the depicted example, include a lunette ring to couple with a pintle hook on the lead vehicle. Each leg 202, 204 includes a front portion 208 and a rear portion 210 connected by a prismatic joint that allows a relative axial sliding motion between the two portions 208, 210, thus facilitating changes in the lengths of the legs 208, 210. In use, each leg 202, 204 is, at its rear end, coupled via two mutually orthogonal revolute joints (that is, joints each enabling rotation about a single axis, also commonly referred to as "pin joints" or "hinge joints") to a fixed location on the follow vehicle's bumper or, alternatively, on a bumper mount 212 to be attached to the front bumper of the follow vehicle. At the first revolute joint, the rear end of the leg 202 or 204 is connected to a rear-end connector 214, and at the second revolute joint, the rear-end connector 214 is in turn connected to the bumper or bumper mount 212, e.g., more specifically, to tow bar eyes 216 (pairs of robust rings, e.g., made of metal) protruding from the bumper or bumper mount 212. The axis of rotation of each first revolute joint, indicated at 218, may be perpendicular to the tether plane (which lies in the plane of the figure), allowing for changes in the angle between the leg and the follow vehicle's bumper in the tether plane. The second revolute joints associated with both legs may share an axis of rotation, indicated at 220, extending in the tether plane between the two rear-end connectors 214, allowing for a relative pitch between the tether plane and the follow-vehicle.

Due to the fixed distance between the two rear-end connectors 214 and the shared front-end connector 206, rotations of the legs 202, 204 in the tether plane (about the axes 218) entail changes in the length of one or both legs 202, 204 (as well as the angle between the legs 202, 204 at their front ends), and vice versa, as illustrated by a comparison of FIGS. 2A and 2B. Put differently, the tether 200 has two internal degrees of freedom of motion in the tether plane, resulting from five adjustable parameters (the lengths of the legs 202, 204; the angle between the two legs 202, 204; and the angles of the legs 202, 204, relative to the follow vehicles bumper) and three constraints (the distance between the two rear-end connectors 214, the shared location of the front ends of both legs 202, 204, and the sum of angles in the triangle), which allow moving the lunette ring of the front-end connector 206 in two dimensions within the tether plane relative to the follow vehicle. When the tether is connected by its front-end connector 206 to a lead vehicle, rotation of the lunette ring about a vertical axis of the pintle hook of the lead vehicle provide a third, external degree of freedom in the tether plane that allows changing the orientation of the lead vehicle relative to the tether, and thus relative to the follow vehicle. Thus, as connected between lead and follow vehicles, the tether 200 constitutes a manipulator with three degrees of freedom in the tether plane. Further, rotations of the lunette ring about two horizontal axes of the pintle hook and rotation of the rear-end connector about the axis 220 provide for three degrees of freedom out of the tether plane (pitch, roll, and relative vertical position).

Figure 3:
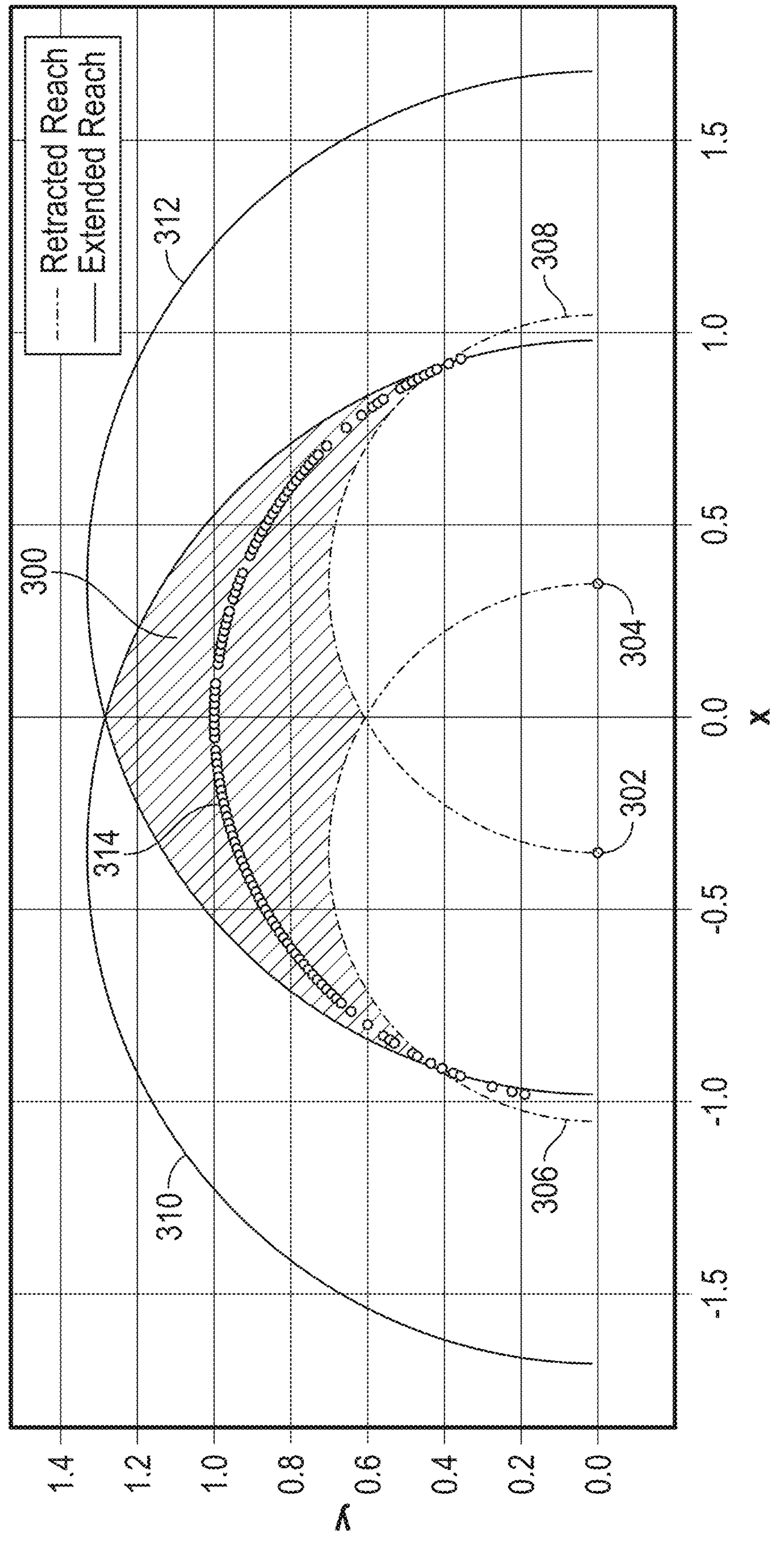
FIG. 3 is a graph illustrating the region over which the front-end connector of the triangular vehicle tether of FIGS. 2A and 2B can be moved.

FIG. 3 is a graph illustrating the region 300 over which the front-end connector 206 of the triangular vehicle tether 200 of FIGS. 2A and 2B can be moved. The fixed mount points of the rear ends of the legs when connected to the follow vehicle are indicated at 302, 304. The semi-circles 306, 308 indicate the possible front-end locations of the two legs 202, 204 in their fully retracted state, and the semi-circles 310, 312 indicate the possible front-end locations of the two legs 202, 204 in their fully extended state. In one non-limiting example, the contracted length of the legs is 0.7 m, and the extended length of the legs is 1.33 m; FIG. 3 illustrates at 314 a corresponding front-end position at 1 m is from the mid-point between the mount points 302, 304. Individually, the front end of the first leg 202 can be anywhere in the region between semi-circles 306 and 310, and similarly, the front end of the second leg 204 can be anywhere in the region between semi-circles 308 and 312. With the front ends of both legs 202, 204 connected to the same front-end connector 206, that front-end connector 206 can move within the intersection (shaded region 300) of the two regions between the semi-circles. The compliant tether 200 provides six degrees of freedom between lead and follow vehicles, including three degrees of freedom in the tether plane within the bounds defined by that intersection region 300.

Figure 4B:
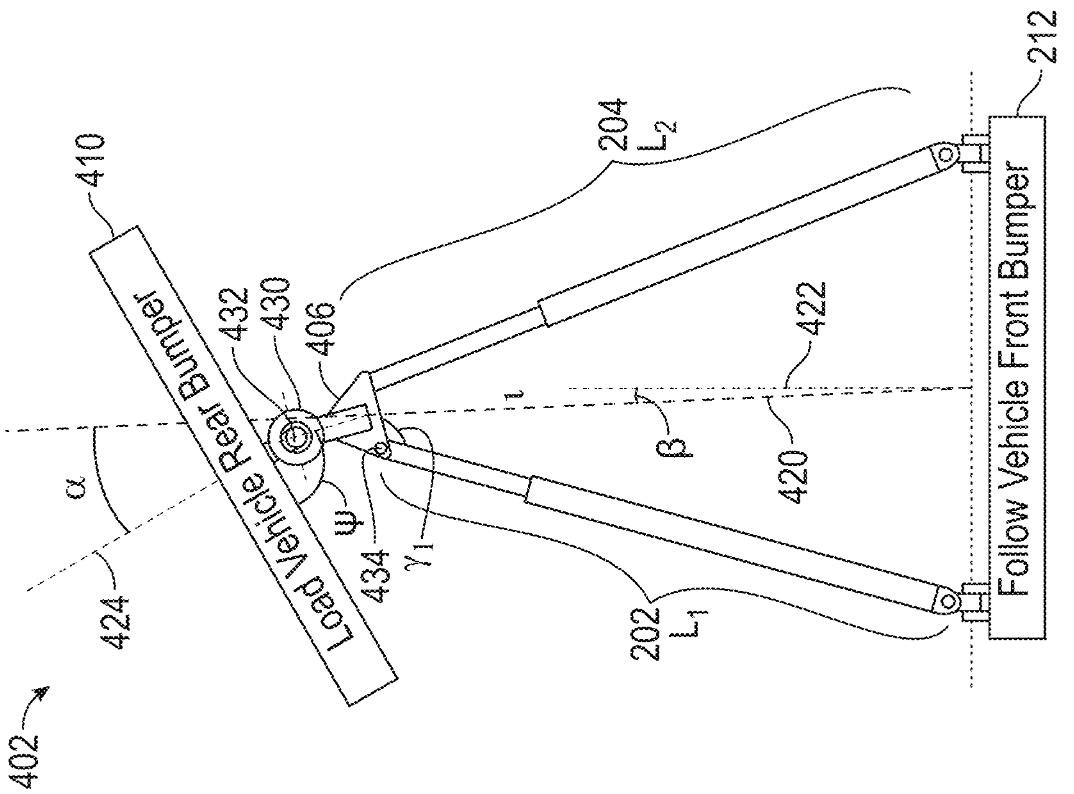
FIGS. 4A and 4B are schematic drawings showing example compliant triangular vehicle tethers with different front-end connectors configured to connect to the lead vehicle by a pintle hitch and a custom hitch, respectively, according to two alternative embodiments, and illustrating the associated adjustable parameters and resulting degrees of freedom of motion in the tether plane.
Figure 4A:
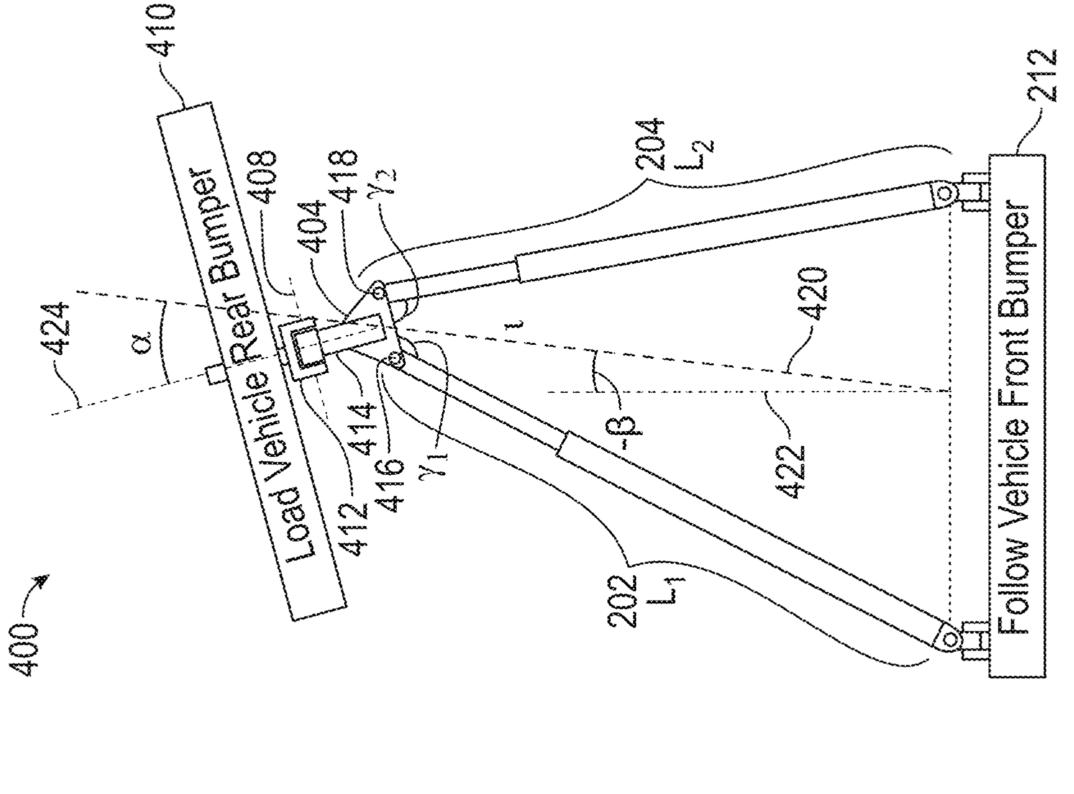

FIGS. 4A and 4B are schematic drawings showing example compliant triangular vehicle tethers 400, 402 with different front-end connectors 404, 406 configured to connect to the lead vehicle by a custom hitch and a pintle hitch, respectively, according to two alternative embodiments, and illustrating the associated adjustable parameters and resulting degrees of freedom of motion in the tether plane. As has already been noted in conjunction with FIG. 1A, the front ends of the two legs 202, 204 are attached to the front-end connector 404 or 406 at two different mount points, such that the configurable shape of the tether 400 or 402, formed by the legs 202, 204, follow vehicle's bumper or bumper mount 212, and front-end connector 202 or 206, is—strictly speaking—quadrilateral, even though the two mount points may be so close that the overall appearance is near-trilateral. While it is in principle also possible to attach the legs to the same mount point on the front-end connector for a truly triangular tether, the front ends of the legs would have to vertically overlap for this purpose, and the tether would therefore no longer be perfectly planar, which is generally undesirable.

In the embodiment of FIG. 4A, the custom hitch is implemented with two revolute joints extending perpendicularly to each other in the plane of the tether 400. The first revolute joint is oriented with its axis 408 parallel to the rear bumper 410 of the lead vehicle; at this joint, the front-end connector 404, to which the legs 202, 204 of the tether 400 are attached, engages with a second connector 412 that may be integrated with the lead vehicle. As shown, the second connector 412 may include, e.g., a pair of tow bar eyes for connection with the front-end connector 404. The second connector 412 is connected to the rear bumper 410 of the lead vehicle by the second revolute joint, whose axis 414 is perpendicular to the rear bumper 410 and coincides with the longitudinal axis of the lead vehicle. The first and second revolute joins allow for relative pitch and roll, respectively, between the rear bumper 410 of the lead vehicle and the front-end connector 404 of the tether 400 (and, thus, the tether plane). Within the tether plane, the front-end connector 404 remains aligned to the lead vehicle.

The two legs 202, 204 are connected to the front-end connector 404 by respective revolute joints 416, 418 perpendicular to the tether plane, and are thus rotatable in the tether plane relative to the front-end connector 404. Accordingly, the angles $\gamma_1$, $\gamma_2$ between the two legs 202, 204 and the edge of the front-end connector 404 (defined between the mount points of the two legs 202, 204) are adjustable (as is, consequently, the angle between the two legs 202, 204). These adjustable angles $\gamma_1$ and $\gamma_2$ together with the adjustable lengths $L_1$ and $L_2$ of the two legs 202, 204 and the adjustable angles (not labeled) between the legs 202, 204 and the follow vehicle's bumper or bumper mount 212, constrained by the fixed distances between the pair of mount points for the front ends and the pair of mount points for the rear ends of the legs and by the sum of interior angles in the quadrilateral, provide three degrees of freedom of motion for adjusting the length $l$ of the tether, the relative angle $\beta$ between the tether centerline 420 and the follow vehicle centerline 422, and the relative angle $\alpha$ between the tether centerline 420 and the lead vehicle centerline 424. (The tether centerline 420 is defined by the mid-point between the mount points of the rear ends of legs on the follow vehicle's bumper or bumper mount 212 and the mid-point between the mount points of the front ends of the legs on the front-end connector 404, and the follow vehicle centerline 422 is defined as a line perpendicular to the follow vehicle's bumper or bumper mount 212 through the mid-point between the mount points of the rear ends of the legs. The length of the tether is a nominal length used in calculating the relative positions between lead and follow vehicles, e.g., defined along the tether centerline 420 between the mid-point of the mount points on the follow vehicle and the joint where the front-end connector couples to the lead vehicle.)

In various embodiments, three or four of the prismatic joints of the legs 202, 204 and the revolute joints 416, 418 at the front ends of the legs are instrumented with sensors. (Alternatively or additionally, the revolute joints at the rear ends of the legs 202, 204 may also be instrumented with sensors.) Suitable types of sensors are well-known to those of ordinary skill in the art, and include, for instance, encoders (e.g., inductive, optical, magnetic, capacitive, Hall-effect, etc.) and potentiometers (resistive encoders). Sensors for angular measurements may be embedded in the tether, e.g., by fixing the sensor base (or stator) to either the legs 202, 204 or the front-end connector 404, 406 and fixing the sensor shaft (or rotor) to the respective other part. Measurements with any three of the sensors enable a full determination of the quadrilateral shape of the tether 400, from which the relative positions and orientations of the lead and follow vehicles in the tether plane—that is, relative yaw, distance, and lateral displacement—can be derived. A fourth or further measurements are used, in some embodiments, to provide a layer of redundancy, e.g., to compute the shape of the tether 400 more accurately, or take some mitigating action (e.g., triggering an alert) in the event of an inconsistency in the sensor measurements. Pitch and roll between the follow and lead vehicles need generally not be measured, as they result passively from road undulations and surface variations, and are not accounted for the active vehicle control.

In the embodiment of FIG. 4B, the pintle hitch is implemented with a front-end connector 406 including a lunette ring 430 that engages a pintle hook 432 affixed to the rear bumper 410 of the lead vehicle (as described with respect to FIGS. 1A and 2A-2B). Here, only one of the legs, as depicted the left leg 202 (without loss of generality), is connected to the front-end connector 406 by a revolute joint 434 perpendicular to the tether plane that allows rotation between the leg 202 and front-end connector 406 in the tether plane. The other leg, as depicted right leg 204, is fixedly attached to the front-end connector 406, removing one degree of freedom. The angle between the two legs 202, 204 can be implicitly adjusted by changing the adjustable angle $\gamma_1$ between the left leg 202 and the edge of the front-end connector 406 defined between the mount points of the two legs 202, 204. This adjustable angle $\gamma_1$ together with the adjustable lengths $L_1$ and $L_2$ of the two legs 202, 204 and the adjustable angles between the legs 202, 204 and the follow vehicle's bumper or bumper mount 212, constrained by the fixed distances between the pair of mount points for the front ends and the pair of mount points for the rear ends of the legs and by the sum of interior angles in the quadrilateral, provide two degrees of freedom of motion for setting the length $l$ of the tether and the relative angle $\beta$ between the tether centerline 420 and the follow vehicle centerline 422. The angle $\alpha$ between the tether centerline 420 and the lead vehicle centerline 424 can be adjusted, without a change in the internal configuration of the tether 402, by rotating the lunette ring 430 about an axis through the pintle hook 432 that extends perpendicular to the tether plane.

In various embodiments, two or three of the prismatic joints of the legs 202, 204 and the revolute joint 434 between the front end of the left leg 202 and the front-end connector 406, are instrumented with sensors. (Alternatively or additionally, the revolute joints at the rear ends of the legs 202, 204 may also be instrumented with sensors.) Since the angle between the right leg 204 and the front-end connector 406 is fixed, measurements with any two of the sensors enable a full determination of the quadrilateral shape of the tether 402, and thus of the length $l$ and the angle $\beta$; a third or further measurements may be used for redundancy as discussed above. However, to fully determine the relative position and orientation of the lead and follow vehicles, one additional measurement, e.g., of the angle $\psi$ between the lead vehicle's rear bumper 410 and the front-end connector 406, is used to solve for the angle $\alpha$ between the tether centerline 420 and the lead vehicle centerline 424; for this purpose, the pintle hitch may be equipped with a suitable sensor.

The compliant triangular vehicle tether is generally usable either as a tow bar through which the lead vehicle pulls the follow vehicle, or when equipped with sensors as described above, as a "smart connect" that allows determining the relative position and orientation (that is, heading) of lead and follow vehicles, based on which the follower vehicle can control its steering, brakes, and throttle autonomously, using suitable algorithms implemented by a combination of hardware and/or software. The follow vehicle may, for example, include an on-board computer that receives the sensor outputs wirelessly (e.g., via Bluetooth) or via a wired connection integrated with the vehicle tether, and processes them to estimate the relative position of the lead vehicle, generate a defined path of the lead vehicle on an odometry map (which involves representing the position of the lead vehicle as a function of time), and then executing a path-following algorithm to operate steering, brakes, and throttle of the follow vehicle so as to follow the path. The on-board computer may include a general-purpose processor and computer memory storing instructions implementing the algorithms, one or more special-purpose processors (such as, e.g., a digital signal processors (DSP), field-programmable gate array (FPGA), or application-specific integrated circuit (ASIC)), hard-wired electronic circuitry, or any combination thereof. Suitable path-following algorithms are known to those of ordinary skill in the art.

Figure 5:
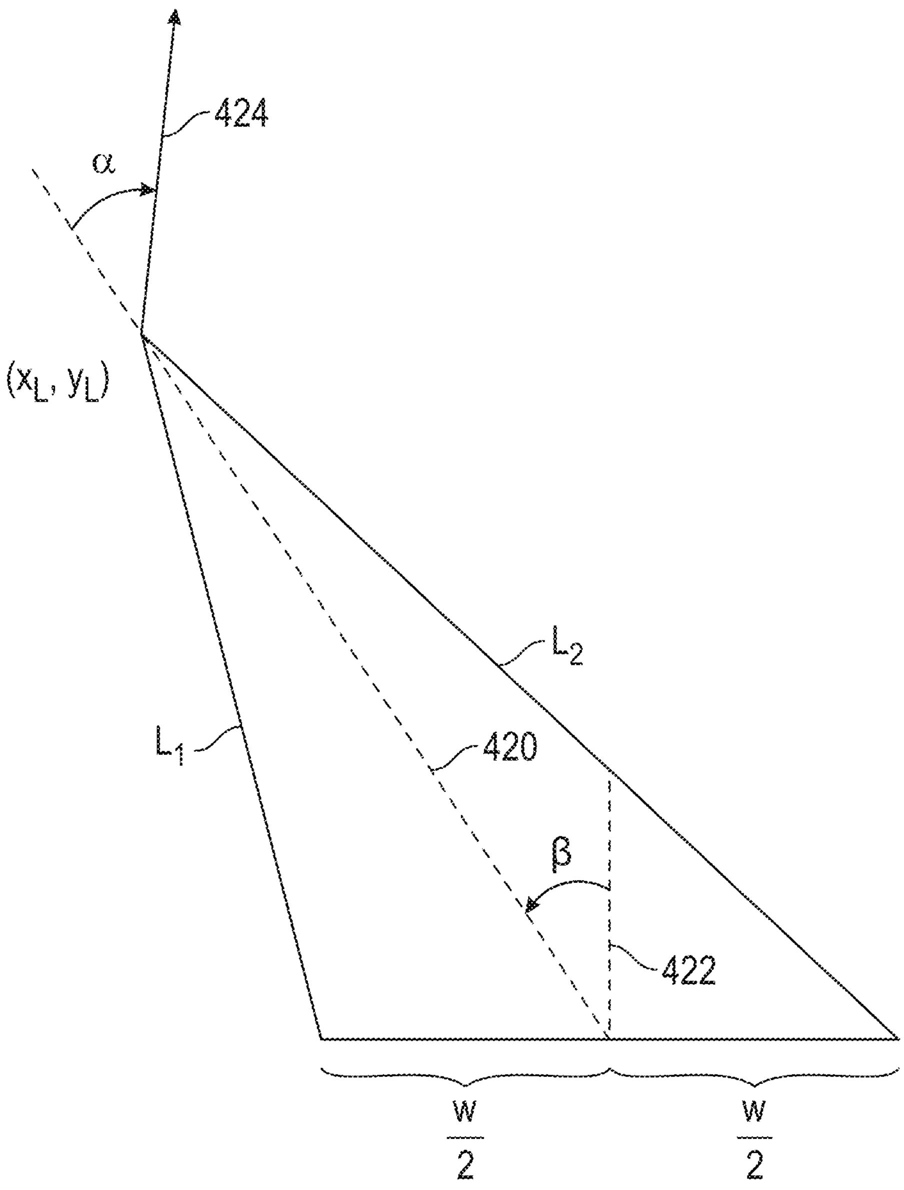
FIG. 5 is a diagram illustrating the computation of the lead vehicle position from measurements of the lengths of the dynamic legs and the relative angle between the tether centerline and the follow vehicle centerline, in accordance with one example embodiment.

FIG. 5 is a diagram illustrating the computation of the lead vehicle position from measurements of the lengths of the dynamic legs and the relative angle β between the tether centerline 420 and the follow vehicle centerline 422, in accordance with one example embodiment. The tether may, for instance, connect to the lead vehicle via a pintle hitch, as illustrated in FIG. 4B. The position of the front-end connector (more specifically, the location where the front-end connector couples to the lead vehicle, such as the lunette ring) relative to the center point on the follow vehicle bumper is denoted by ($x_L$, $y_L$), and the distance between the mount points of the vehicle tether on the follow vehicle bumper is denoted by w. From the measured lengths $L_1$, $L_2$ of the dynamic legs of the tether and the distance w, the position of the lunette and the angle β can be computed according to:

$$x_L = \frac{L_1^2 - L_2^2}{2w}$$

$$y_L = \sqrt{L_1^2 - x_L^2 - wx_L - \frac{w^2}{4}}$$

$$\beta = \arctan\frac{x_L}{y_L}$$

The relative orientation between lead and follow vehicles can be computed straightforwardly from β and the separately measured angle α between the tether centerline 420 and the lead vehicle centerline 424.

Given the computed path of the lead vehicle, the follow vehicle may be controlled to maintain a "neutral" length of the vehicle tether, e.g., a length that is about mid-way between the fully extended and fully extracted states, while following the path. To aid maintaining this neutral state and to provide stability to the system, the prismatic joints of the dynamic legs of the compliant towbar may be damped actively and controllably via a mechanism such as electrically actuated hydraulic flow control valves. When the valves are open wide, hydraulic fluid can freely flow between separated chambers of the damping mechanism, resulting in low damping and low forces on the tether. To increase damping and generate higher forces proportional to the linear velocity of the prismatic joint (i.e., the relative velocity between front and rear portions of the legs), the valves may be closed down. In general, at low speed and while the tether is near the neutral position, the valves are opened relatively wide to allow free movement of the front-end connector, but at high speeds, when sharp turns will typically not be made, the valves are closed down. Also, as the dynamic legs of the compliant vehicle tether near their limits of travel, the valves may close to help maintain the neutral position.

Figure 6A:
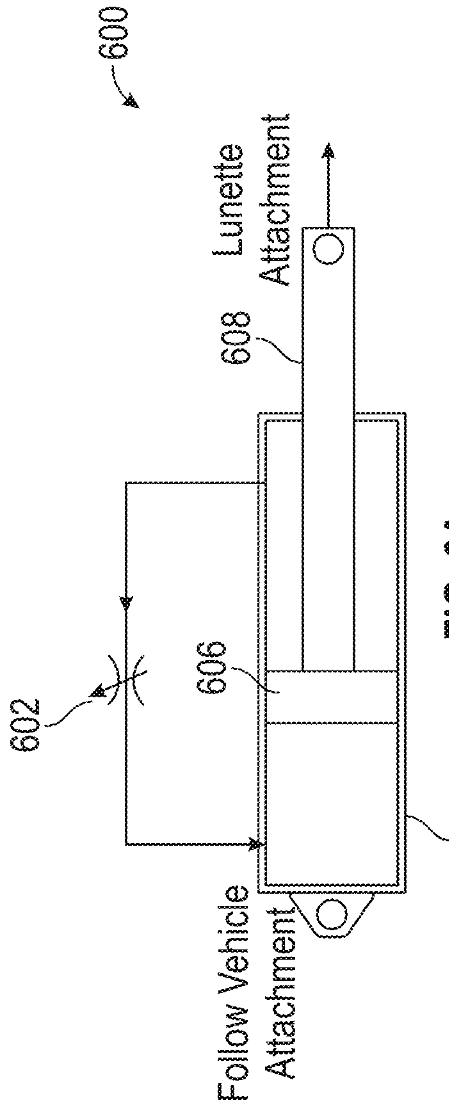
FIG. 6A is a schematic drawing of a damped dynamic leg implementing the prismatic joint by a double-acting cylinder equipped with a flow control valve, in accordance with various embodiments.

FIG. 6A is a schematic drawing of an example damped dynamic leg 600 implementing the prismatic joint by a double-acting cylinder equipped with a flow control valve 602, in accordance with various embodiments. In the depicted example, a fluid-filled cylinder 604 forms the static stage of the prismatic joint and as such part of the rear portion of the leg 600, which is connected to the follow vehicle. A piston 606 moving inside the cylinder 604 is connected to the dynamic stage of the prismatic joint and thus the front portion 608 of the leg 600, which is in turn connected to the lead vehicle. As the piston 606 moves back and forth inside the cylinder 604, fluid is forced through the flow control valve 602 along a flow path between the two chambers formed in the cylinder 604 to both sides of the piston 606. The valve 602 may be an electric-over-hydraulic flow control valve that allows electronically regulating the flow rate through the system. By adjusting the flow rate to provide more or less resistance to changes in the linear displacement of piston 606 relative to the cylinder, damping of dynamic leg 600 can be controlled.

Figure 6B:
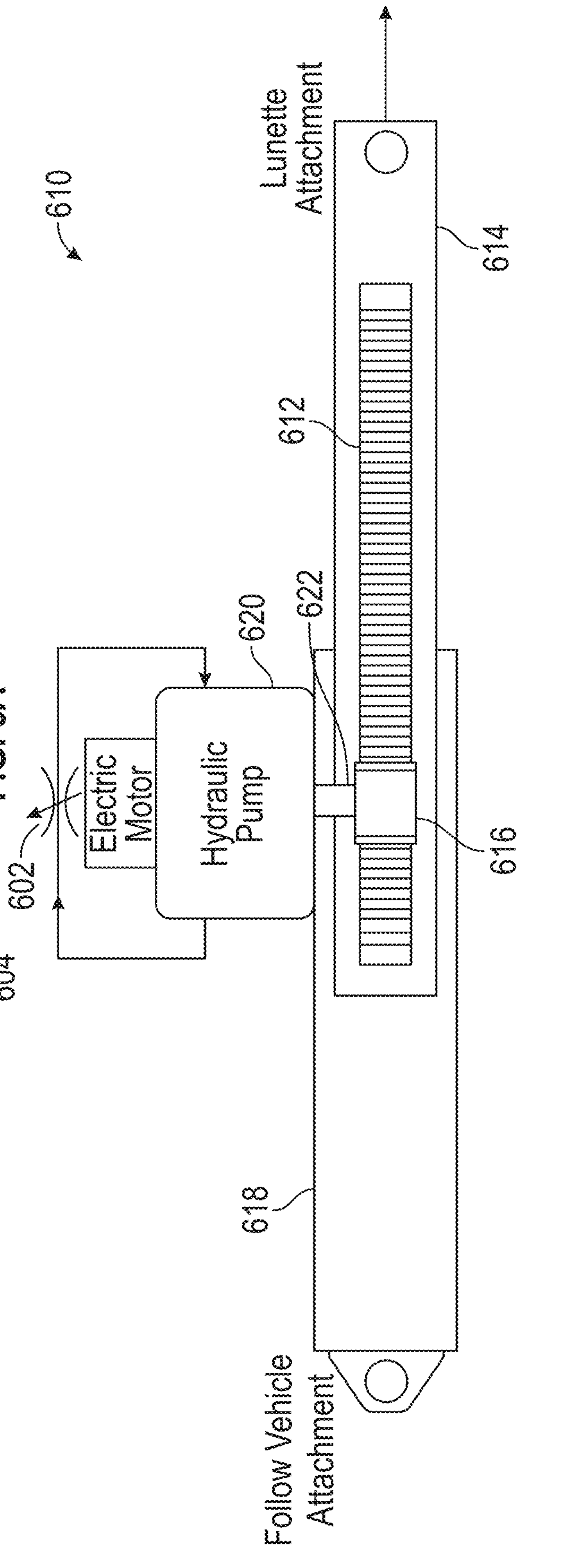
FIG. 6B is a schematic drawing of a damped dynamic leg implementing the prismatic joint by a rack-and-pinion system equipped with a rotary damper including a flow control valve, in accordance with various embodiments.

FIG. 6B is a schematic drawing of an example damped dynamic leg 610 implementing the prismatic joint by a rack-and-pinion system equipped with rotary damper including a flow control valve 602, in accordance with various embodiments. In this example, a linear gear rack 612 is mounted to a dynamic rod 614 that forms the front portion of the dynamic leg 610. The gear rack 612 is meshed with a pinion 616 mounted at a fixed position to a static housing 618 that forms part of the rear portion of the dynamic leg 610. The rotary damper is implemented by a hydraulic pump 620 connected to the flow control valve 602. As the dynamic rod 614 moves in and out of the housing 618, the pinion 616 turns the input shaft 622 of the hydraulic pump 620, which as a result forces hydraulic fluid through the flow control valve 602, where energy is dissipated as heat. Again, the valve 602 may be an electric-over-hydraulic flow control valve, which allows electronically adjusting the flow rate to control the amount of damping provided by the dynamic leg. (The depicted electric motor may be used to facilitate autonomous connection between the vehicles.)

Figure 6C:
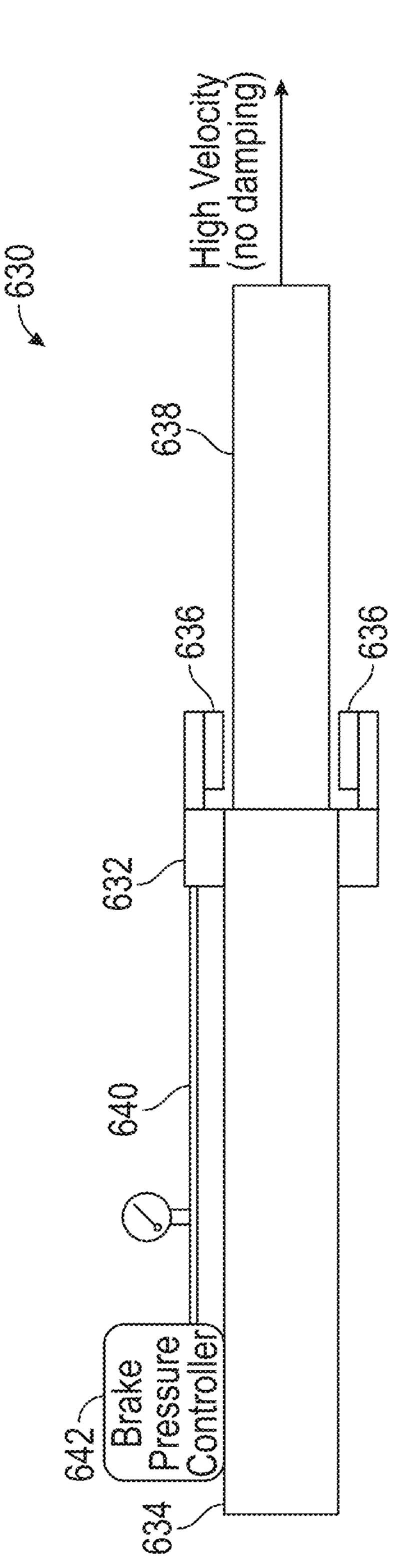
FIGS. 6C and 6D are schematic drawings of a damped dynamic leg implementing the prismatic joint by a rack-and-pinion system equipped with a friction brake, in accordance with various embodiments.
Figure 6D:
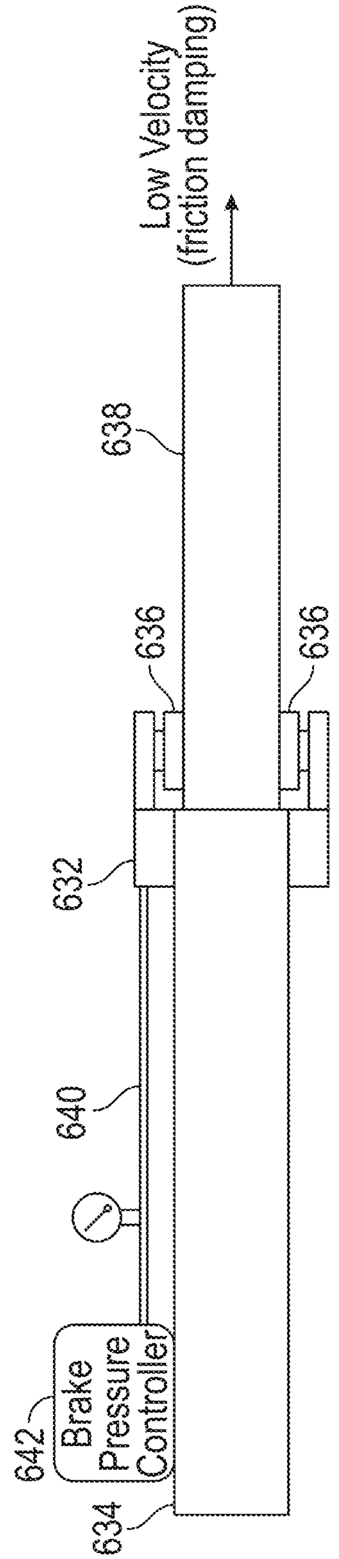

FIGS. 6C and 6D are schematic drawings of a damped dynamic leg 630 implementing the prismatic joint by a rack-and-pinion system equipped with a friction brake, in accordance with various embodiments, shown in the disengaged and the engaged state, respectively. The brake caliper 632 is mounted to the static stage 634, which belongs to the rear portion of the dynamic leg. As the dynamic stage 638, which belongs to the front portion of the dynamic leg, moves back and forth, the braker caliper 632 presses a wear-resistant brake pad 636 into a smooth, hardened surface applied to the dynamic stage 638, creating a friction force to decrease the relative velocity of the two stages, and dissipating kinetic energy as heat. A pressure signal line 640 carries a pneumatic or hydraulic pressure to the brake caliper 632, causing the brake pads 636 to press against the dynamic stage, as shown in FIG. 6D, with a force proportional to the supplied pressure. The brake caliper 632 may, alternatively, be electrically actuated; in this case, the signal line will carry an electrical signal to control the brake pressure. The brake pressure controller 642 controls damping by generating the pressure signal to be supplied, via the pressure signal line 640, to the brake caliper 632. Feedback control methods may be used to adjust the pressure signal to achieve the desired damping value.

Figure 7A:
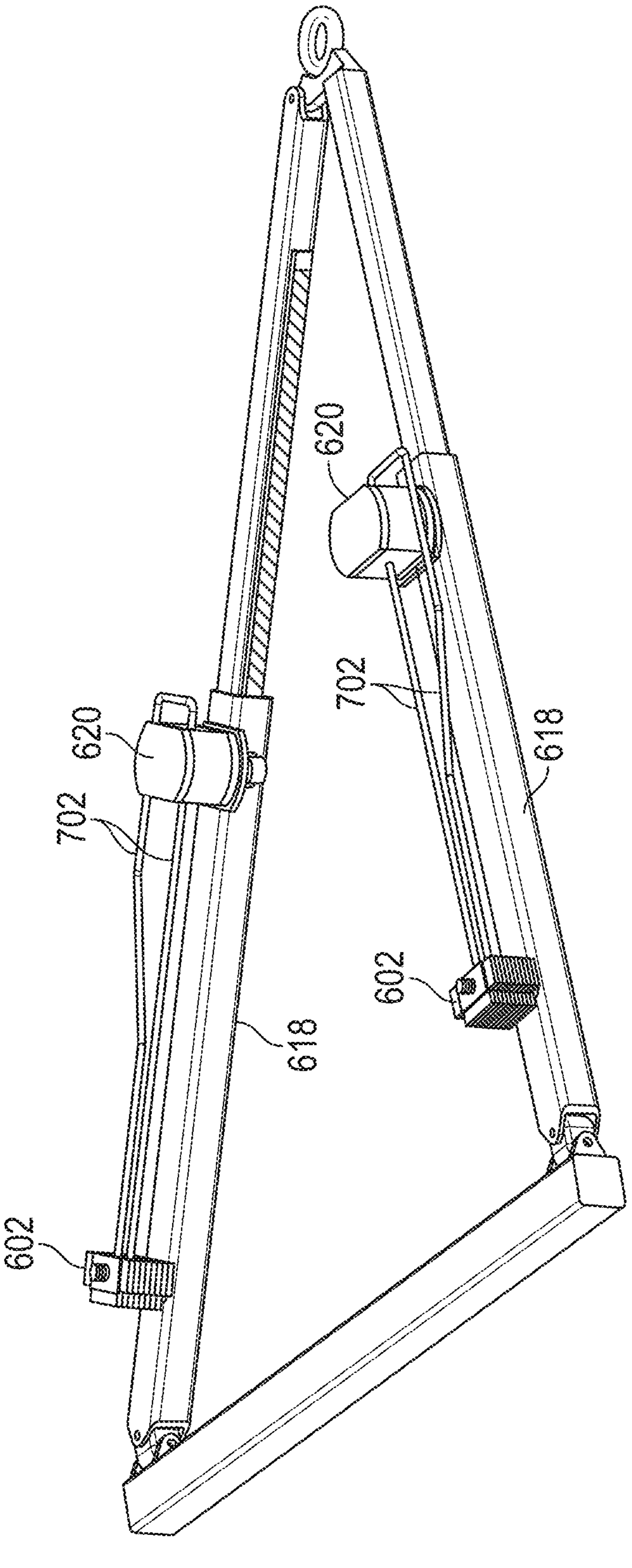
FIGS. 7A and 7B are drawings showing, in perspective and transparent perspective views, respectively, one example of a compliant triangular vehicle tether with prismatic joints implemented by rack-and-pinion systems equipped with rotational dampers, in accordance with the embodiment of FIG. 6B.
Figure 7B:
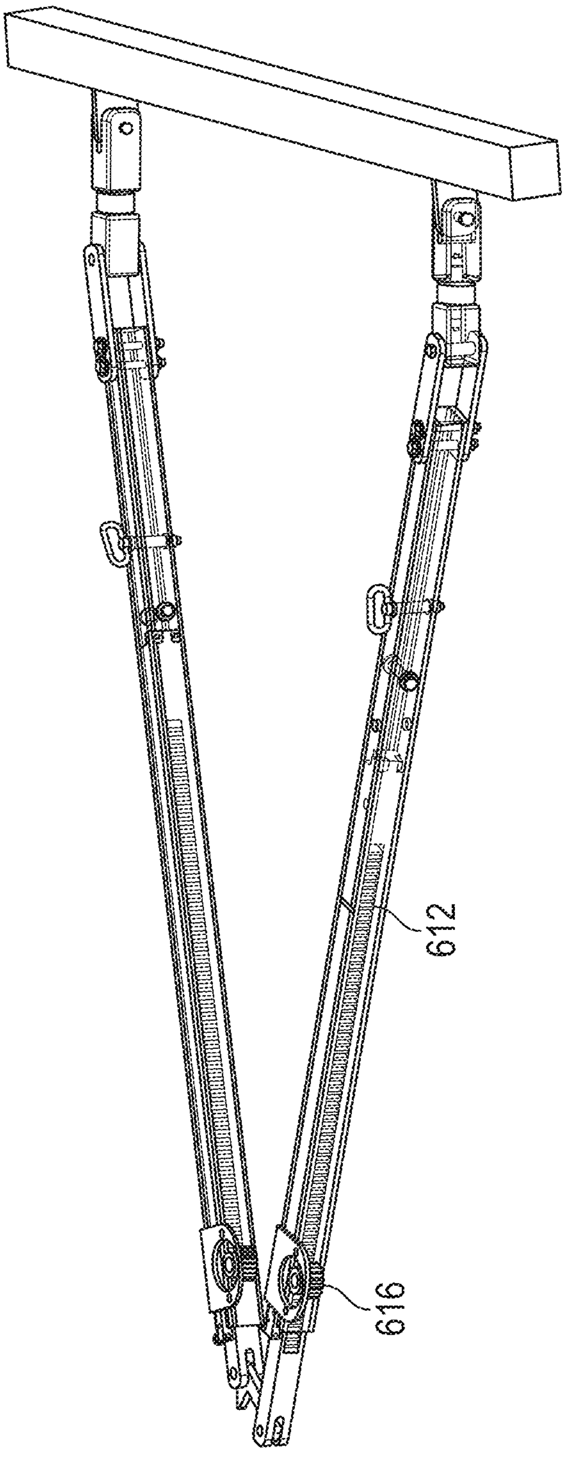

FIGS. 7A and 7B are drawings showing, in perspective and transparent perspective views, respectively, one example of a compliant triangular vehicle tether 700 with prismatic joints implemented by rack-and-pinion systems equipped with rotational dampers, in accordance with the embodiment of FIG. 6B. FIG. 7A illustrates, in particular, the hydraulic pumps 620 and associated fluid lines 702 and flow control valves 602 mounted externally to the housings 618 of the rear portions of the dynamic legs. FIG. 7B provides a view of the gear rack 612 within the front portion of the leg and the pinion 616 mounted to the rear portion. As the pinion 616 rotates counter-clockwise while engaging the rack 612, the rack 612 will move to the left, away from the follow vehicle bumper mount 212, extending the leg. FIG. 7B also shows a number of pins used to lock the tether in place when used as a conventional tow bar.

In addition to active damping, various embodiments may utilize passive damping to augment the end-of-travel damping. For prismatic joints implemented with hydraulic cylinders, as shown in FIG. 6A, hydraulic "cushions" may be used to slow the velocity of the piston as it nears the end of its stroke. In the case of the rack-and-pinion configuration of FIG. 6B, passive spring-dampers may be used to decelerate and cushion the prismatic joint at each end of the stroke. This cushioning is done to prevent large impulse forces on the compliant tether that would contribute to accelerated fatigue and wear.

In various embodiments, the dynamic legs of the compliant vehicle tether can be pinned in place at the neutral position so that, in the event of a mechanical or electrical failure, the tether can continue to be used as a passive tow bar. The follow vehicle can then either be passively towed, or enter a tow-bar control mode, where it assists in the towing effort by steering and pulling and stopping its own mass.

Figure 8A:
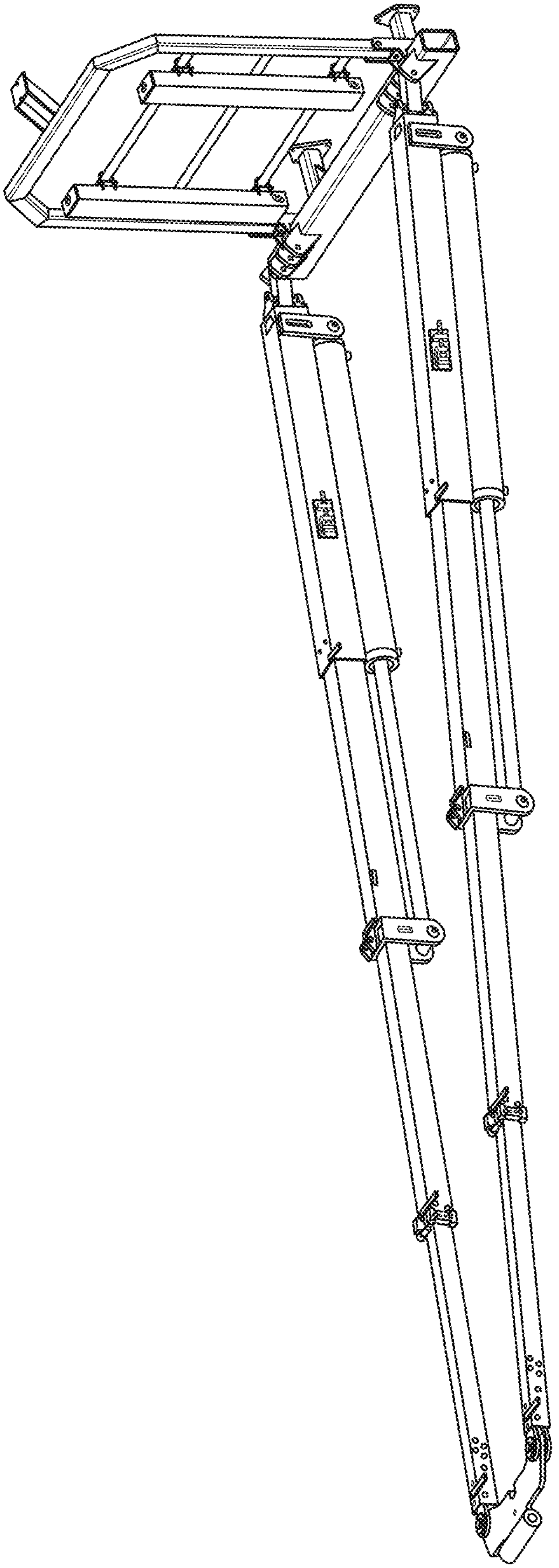
FIGS. 8A-8C are drawings showing in perspective views a foldable vehicle tether in extended, fully retracted, and fully folded upright configurations, respectively.
Figure 8B:
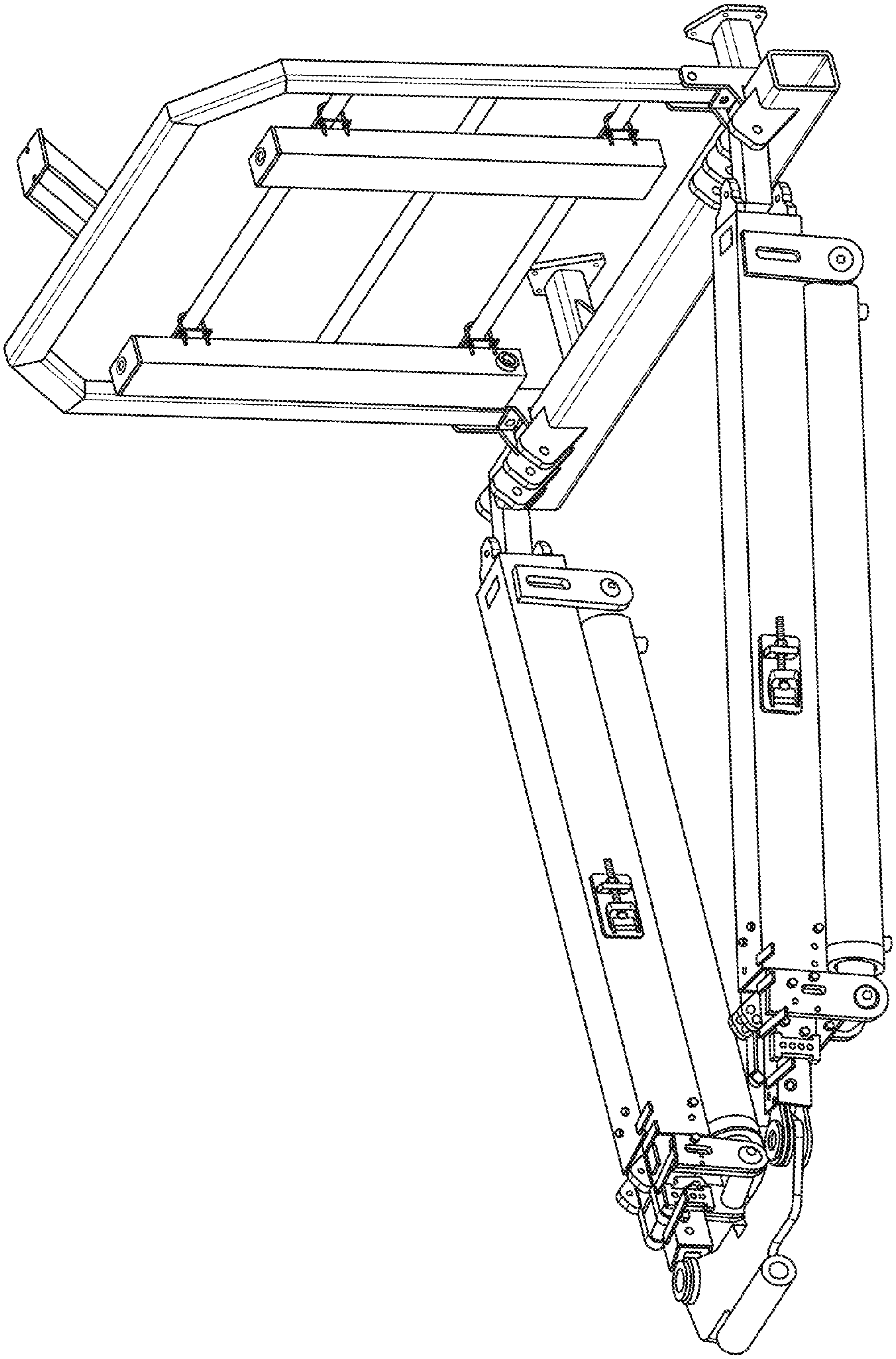
Figure 8C:
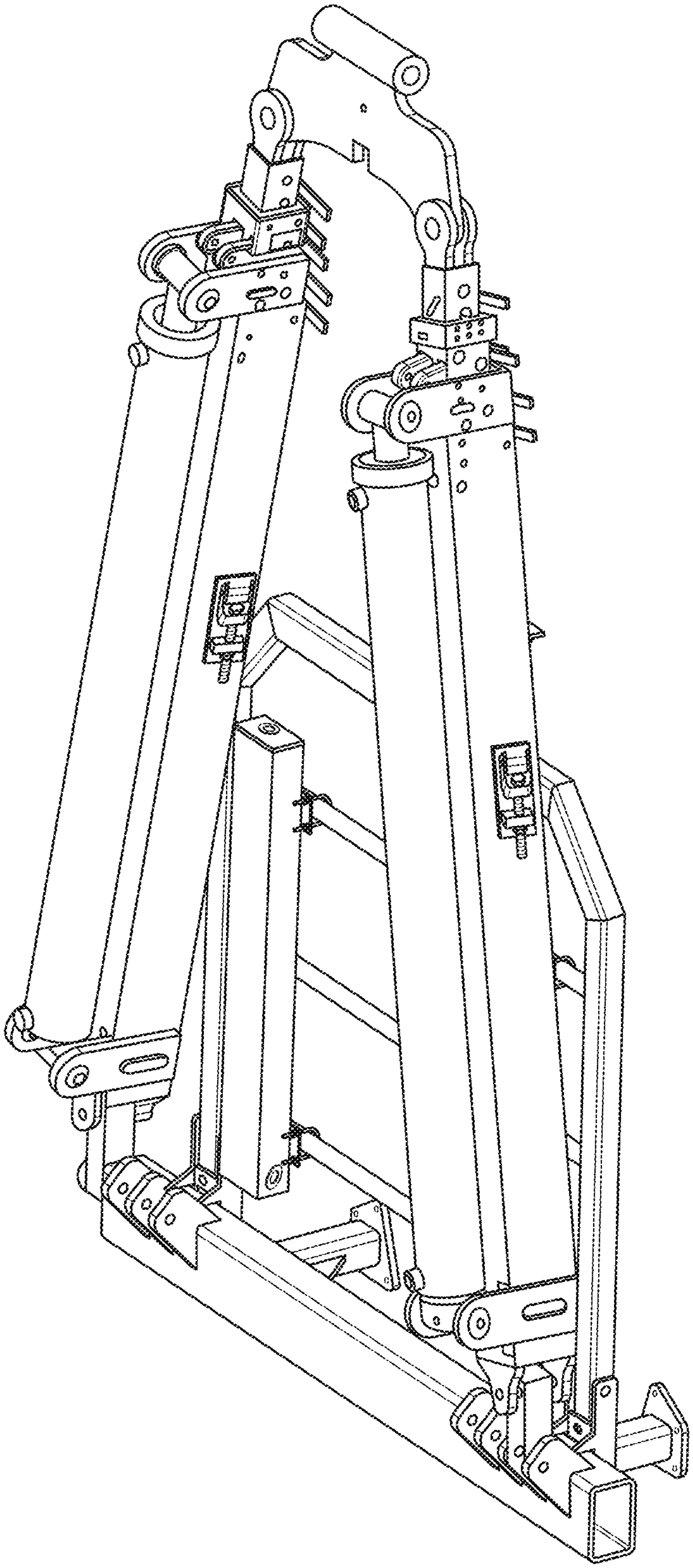

In some embodiments, the compliant vehicle tether is designed to seamlessly integrate with existing towing hardware, allowing it to replace a conventional passive triangular tow bar without the need for changes on the rear bumper of the lead vehicle or the front bumper of the follow vehicle. For example, as described above, the rear-end connectors of the tether may be configured to connect to the front bumper of the follow vehicle via standard tow bar eyes as can be found on the majority of military vehicles and many commercial trucks (in particular those used off-road), e.g., using a u-joint-like, or double-pin-joint-like, connection that allows for relative pitch and yaw. Further, the front-end connector may be configured with lunette ring that facilitates connection with the lead vehicle via a standard pintle hitch. When not in use, the vehicle tether may be decoupled from the lead vehicle and detached from the front vehicle simply by removing a few pins or bolts. Alternatively, in some embodiments, the vehicle tether is foldable and includes a bumper mount that can be installed on a vehicle to be used as a follower, such that, when the tether is not in use, it can be stowed in a folded position in front of the follow vehicle, ready to be deployed. FIGS. 8A-8C are drawings showing in perspective views a foldable vehicle tether in extended, fully retracted and fully folded upright configurations, respectively. Alternatively to folding the legs vertically, as shown, it is possible to fold them horizontally after un-pinning the front-end connector at joints 416, 418, 432.

In some embodiments, the compliant vehicle tether is further equipped with motorized actuators that facilitate automatic connection of vehicles to create a platoon. For example, the two prismatic joints of the legs and one revolute joint of the tether may be actuated by electric motors, either directly through a gear reduction or indirectly through an electric-over-hydraulic system. To engage the front-end connector with its counterpart on the lead vehicle (e.g., to engage the lunette ring with a pintle hook), the follow vehicle may first be driven, manually or automatically (e.g., based on machine vision using a camera view of the lead vehicle) to position the front-end connector near (e.g., within a specified distance from) its attachment point on the lead vehicle, and the actuators of the tether are then operated to adjust the position of the front-end connector until it engages.

The various features and embodiments of the vehicle tether that have been described can be used in different combinations, and various modifications, additional combinations of features, and further applications may occur to those of ordinary skill in the art. Accordingly, the described embodiments are intended as illustrative example, and not as limiting.

What is claimed is:

1. A vehicle tether for physically tethered vehicle platooning, the vehicle tether comprising:

two dynamic legs each including a damped prismatic joint configurable to adjust a length of the dynamic leg between a front end and a rear end of the dynamic leg;

a front-end connector connected to the front ends of the two dynamic legs and connectable to a lead vehicle by front-end joints configurable to adjust two relative angles in a tether plane defined by the two dynamic legs, the two relative angles selected among angles defined between the front-end connector, the two dynamic legs, and the lead vehicle; and two rear-end connectors each connected to a rear end of a respective one of the two dynamic legs and both connectable to a follow vehicle by rear-end joints configurable to adjust first and second relative angles defined between each of the two dynamic legs and the follow vehicle, the first angle being in the tether plane and the second angle being about an axis extending in the tether plane between the two rear-end connectors.

2. The vehicle tether of claim 1, wherein the front-end connector is connectable to the lead vehicle with two rotational degrees of freedom about two respective mutually perpendicular axes of rotation in the tether plane.

3. The vehicle tether of claim 1, wherein the two relative angles in the tether plane that are adjustable by the front-end joints are angles between the two dynamic legs and the front-end connector.

4. The vehicle tether of claim 3, further comprising embedded sensors configured to measure at least three parameters selected from the group consisting of: the length of a first one of the two dynamic legs, the length of a second one of the two dynamic legs, an angle between the first one of the two dynamic legs and the front-end connector, and an angle between the second one of the two dynamic legs and the front-end connector.

5. The vehicle tether of claim 1, wherein the two relative angles in the tether plane that are adjustable by the front-end joints include an angle between the front-end connector and the lead vehicle and an angle between one of the two dynamic legs and the front-end connector.

6. The vehicle tether of claim 5, further comprising embedded sensors configured to measure at least three parameters selected from the group consisting of: the length of a first one of the two dynamic legs, the length of a second one of the two dynamic legs, the angle between the one of the two dynamic legs and the front-end connector, and the angle between the front-end connector and the lead vehicle.

7. The vehicle tether of claim 1, further comprising a bumper mount for attachment to a front bumper of the follow vehicle, the two rear-end connectors being connected to the bumper mount at fixed locations.

8. The vehicle tether of claim 1, wherein the rear ends of the two dynamic legs are each connected to the respective two rear-end connectors by respective revolute joints having axes perpendicular to the tether plane, and wherein the two rear-end connectors are connectable to the follow vehicle at respective revolute joints having a shared axis extending in the tether plane between the two rear-end connectors.

9. The vehicle tether of claim 1, wherein the damped prismatic joints each comprise an electrically actuated flow control valve for controllable active damping.

10. The vehicle tether of claim 1, wherein the damped prismatic joints each comprise a passive damper to slow changes in length of the dynamic legs near their limits of travel.

11. The vehicle tether of claim 1, wherein the damped prismatic joints each comprise a hydraulic cylinder.

12. The vehicle tether of claim 11, wherein the hydraulic cylinders each comprise a double-acting cylinder equipped with a flow control valve configurable to adjust a resistance of the dynamic leg to changes in its length.

13. The vehicle tether of claim 12, wherein the damped prismatic joints each further comprise a hydraulic cushion for end-of-travel damping.

14. The vehicle tether of claim 1, wherein the damped prismatic joints each comprise a gear rack meshed with a pinion.

15. The vehicle tether of claim 14, wherein the damped prismatic joints each further comprise a rotary hydraulic damper including a hydraulic pump to force hydraulic fluid through a flow control valve, an input shaft of the hydraulic pump being connected to and actuated by the pinion, the flow control valve configurable to adjust a resistance of the dynamic leg to changes in its length.

16. The vehicle tether of claim 15, wherein the damped prismatic joints each further comprise a spring damper for end-of-travel damping.

17. The vehicle tether of claim 14, wherein the damped prismatic joints each further comprise a friction brake.

18. The vehicle tether of claim 1, further comprising at least three embedded sensors configured to measure at least three parameters selected from the group consisting of: the length of a first one of the two dynamic legs, the length of a second one of the two dynamic legs, an angle between the first dynamic leg and the front-end connector, an angle between the second dynamic leg and the front-end connector, and an angle between the front-end connector and the lead vehicle.

19. A vehicle tether for hard vehicle platooning, the vehicle tether comprising:

first and second dynamic legs each including a prismatic joint configurable to adjust a length of the dynamic leg between a front end and a rear end of the dynamic leg;

a front-end connector connected to the front ends of the first and second dynamic legs and connectable to a lead vehicle by front-end joints configurable to adjust two relative angles in a tether plane defined by the first and second dynamic legs, the two relative angles selected among an angle between the first dynamic leg and the front-end connector, an angle between second dynamic leg and the front-end connector, and an angle between the front-end connector and the lead vehicle;

first and second rear-end connectors connected to a rear end of the first and second dynamic legs, respectively, and connectable to a follow vehicle by rear-end joints configurable to adjust relative angles defined between each of the first and second dynamic legs and the follow vehicle in the tether plane; and four embedded sensors configured to measure at least four parameters selected from the group consisting of: the length of the first dynamic leg, the length of the second dynamic leg, the angle between the first dynamic leg and the front-end connector, the angle between the second dynamic leg and the front-end connector, the angle between the front-end connector and the lead vehicle, the angle between the first dynamic leg and the follow vehicle, and the angle between the second dynamic leg and the follow vehicle.

20. A method for physically tethered vehicle platooning using a vehicle tether including two dynamic legs each including a damped prismatic joint and a front-end connector connected to front ends of the two dynamic legs, the method comprising:

connecting rear ends of the two dynamic legs to a front of a follow vehicle at two respective points;

connecting the front-end connector to a rear of a lead vehicle;

sensing a number of adjustable parameters of the vehicle tether that collectively fully determine a relative position and orientation of the lead vehicle and the follow vehicle in a plane of the vehicle tether; and automatically controlling steering, braking, and throttle of the follow vehicle based on the relative position and orientation.

21. The method of claim 20, wherein the damped prismatic joints comprise electrically actuated hydraulic flow control valves, the method further comprising adjusting the flow control valves to control a degree of damping of the prismatic joints.

* * * * *